US012142178B2

(12) United States Patent
Eom et al.

(10) Patent No.: US 12,142,178 B2
(45) **Date of Patent: *Nov. 12, 2024**

(54) DISPLAY DEVICE AND METHOD OF DRIVING DISPLAY DEVICE

(71) Applicant: Samsung Display Co., Ltd., Yongin-si (KR)

(72) Inventors: Jiyoung Eom, Yongin-si (KR); Sang-Won Lee, Hwaseong-si (KR); Dong-Sung Im, Asan-si (KR); Seonghwan Choi, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,104

(22) Filed: Aug. 15, 2023

(65) Prior Publication Data

US 2023/0386381 A1 Nov. 30, 2023

Related U.S. Application Data

(63) Continuation of application No. 17/499,120, filed on Oct. 12, 2021, now Pat. No. 11,735,082.

(30) Foreign Application Priority Data

Dec. 22, 2020 (KR) ........................ 10-2020-0181028

(51) Int. Cl.
*G09G 3/20* (2006.01)

(52) U.S. Cl.
CPC ....... *G09G 3/20* (2013.01); *G09G 2300/0842* (2013.01); *G09G 2310/08* (2013.01); *G09G 2320/029* (2013.01); *G09G 2320/0693* (2013.01)

(58) Field of Classification Search
CPC ............. G09G 3/20; G09G 2300/0842; G09G 2310/08; G09G 2320/029; G09G 2320/0693
See application file for complete search history.

(56) References Cited

U.S. PATENT DOCUMENTS

| | | | | |
|---|---|---|---|---|
| 11,735,082 | B2 * | 8/2023 | Eom | G09G 3/20 345/214 |
| 2018/0082639 | A1 | 3/2018 | Shin et al. | |
| 2020/0193905 | A1 | 6/2020 | Yoon et al. | |
| 2021/0183299 | A1 | 6/2021 | Park et al. | |

FOREIGN PATENT DOCUMENTS

| | | | |
|---|---|---|---|
| KR | 101250787 | B1 | 4/2013 |
| KR | 1020170072421 | A | 6/2017 |
| KR | 1020180032706 | A | 4/2018 |

* cited by examiner

*Primary Examiner* — Stephen G Sherman
(74) *Attorney, Agent, or Firm* — CANTOR COLBURN LLP

(57) ABSTRACT

A method of driving a display device includes: sensing characteristic information of pixels by outputting sensing voltages to sensing lines; and operating an external compensation of the pixels based on the characteristic information. The sensing of the characteristic information of pixels includes: detecting a capacitance deviation of sensing capacitors of first sensing lines connected to the sensing lines; and sensing the characteristic information of the pixels by replacing at least one of the first sensing lines with a second sensing line based on the capacitance deviation.

20 Claims, 8 Drawing Sheets

DISPLAY DEVICE AND METHOD OF DRIVING DISPLAY DEVICE

This application is a continuation of U.S. patent application Ser. No. 17/499,120, filed on Oct. 12, 2021, which claims priority to Korean Patent Application No. 10-2020-0181028, filed on Dec. 22, 2020, and all the benefits accruing therefrom under 35 U.S.C. § 119, the content of which in its entirety is herein incorporated by reference.

BACKGROUND

Field

Embodiments of the present inventive concept relate to a display device and a method of driving a display device. More particularly, embodiments of the present inventive concept relate to a display device to sense a characteristic value of a driving transistor included in a pixel, and a method of driving the display device.

Description of the Related Art

In general, a display device may include a display panel and a display panel driver. The display panel may include a plurality of gate lines, a plurality of data lines, and a plurality of sensing lines. The display panel driver may include a gate driver providing a gate signal to the plurality of gate lines, a data driver providing a data voltage to the data lines, and a sensing circuit providing a sensing voltage to the sensing lines.

Meanwhile, the sensing lines connecting pixels and the sensing circuit may include sensing capacitors. The sensing capacitors may store a characteristic value of a first thin film transistor (or referred as to a driving transistor) or a change of the characteristic value as a voltage. A capacitance deviation between the sensing capacitors may increases. In this case, the dispersion of the overall capacitance of the sensing circuit may increase, so that a sensing efficiency decreases, and vertical stripes are visually recognized on the display panel due to noise voltages.

SUMMARY

Embodiments of the present inventive concept provide a display device capable of sensing a characteristic information by replacing sensing lines with an additional sensing line based on a capacitance deviation of the sensing lines.

Embodiments of the present inventive concept also provide a method of driving a display device capable of sensing a characteristic information by replacing sensing lines with an additional sensing line based on a capacitance deviation of the sensing lines.

In an embodiment of a display device according to the present inventive concept, a display device includes: a display panel including gate lines, data lines, sensing lines, and pixels, where the pixels are electrically connected with the gate lines, the data lines and the sensing lines, and are configured to display an image based on input image data; a gate driver which outputs gate signals to the gate lines; a data driver which outputs data voltages to the data lines; a sensing circuit which senses characteristic information of the pixels by outputting sensing voltages to the sensing lines, and operates an external compensation of the pixels based on the characteristic information; and a driving controller which controls the gate driver, the data driver, and the sensing circuit. The sensing circuit includes first sensing lines and a second sensing line, and is configured to sense a capacitance deviation of sensing capacitors of the first sensing lines, and sense the characteristic information of the pixels by replacing at least one of the first sensing lines with the second sensing line based on the capacitance deviation.

In an embodiment, the at least one of the first sensing lines and the second sensing line may be connected by a dual transistor.

In an embodiment, the dual transistor may be composed of a N-channel metal oxide semiconductor transistor.

In an embodiment, the driving controller may control a level of a logic voltage applied to a gate electrode of the dual transistor based on the capacitance deviation.

In an embodiment, when the sensing circuit receives a logic high voltage from the driving controller, the sensing circuit may sense the characteristic information of the pixels using the first sensing lines.

In an embodiment, when the sensing circuit receives a logic low voltage from the driving controller, the sensing circuit may sense the characteristic information of the pixels using the second sensing line.

In an embodiment, the sensing circuit may include a deviation detector which detects the capacitance deviation by applying a DC voltage to the sensing circuit, obtains deviation information of the sensing capacitors, and transmits the deviation information to the driving controller.

In an embodiment, wherein when the sensing circuit senses the characteristic information using the second sensing line which is replaced the at least one of the first sensing lines, the deviation detector may detect the capacitance deviation by applying the DC voltage to the sensing circuit, so that the deviation detector checks whether the capacitance deviation is improved.

In an embodiment, the second sensing line may be connected to each of the first sensing lines.

In an embodiment, the second sensing line may sense the characteristic information of the pixels by replacing a first sensing line which has the greatest capacitance deviation among the first sensing lines.

In an embodiment, the second sensing line may be provided in plural.

In an embodiment of a method of driving a display device according to the present inventive concept, the method includes: sensing characteristic information of pixels by outputting sensing voltages to sensing lines; and operating an external compensation of the pixels based on the characteristic information. The sensing of the characteristic information may include: detecting a capacitance deviation of sensing capacitors of first sensing lines connected to the sensing lines; and sensing the characteristic information of the pixels by replacing at least one of the first sensing lines with a second sensing line based on the capacitance deviation.

In an embodiment, the at least one of the first sensing lines and the second sensing line may be connected by a dual transistor.

In an embodiment, the dual transistor may be composed of a N-channel metal oxide semiconductor transistor.

In an embodiment, the method may further include controlling a level of a logic voltage applied to a gate electrode of the dual transistor based on the capacitance deviation.

In an embodiment, when a logic high voltage is applied, the sensing of the characteristic information may include sensing the characteristic information of the pixels using the first sensing lines.

In an embodiment, when a logic low voltage is applied, the sensing of the characteristic information may include sensing the characteristic information of the pixels using the second sensing line.

In an embodiment, the sensing of the characteristic information may further include detecting the capacitance deviation by applying a DC voltage to the first sensing lines, and obtaining deviation information of the sensing capacitors.

In an embodiment, when the characteristic information of the pixels are sensed by replacing the at least one of the first sensing lines with the second sensing line, the sensing of the characteristic information may include detecting the capacitance deviation by applying the DC voltage to the first sensing lines, so that the deviation detector checks whether the capacitance deviation is improved.

In an embodiment, the second sensing line may be connected to each of the first sensing lines.

The display device according to the present inventive concept may reduce the capacitance deviation of sensing capacitors of the sensing lines, so that the display device improves a image quality of a display panel. In addition, the display device according to the present inventive concept may improve the yield of the display device by reducing the defective rate of the sensing circuit due to an increase in the dispersion of the sensing capacitors of the display device. In addition, the display device according to the present inventive concept may reduce a manufacturing cost of the display device by reducing a capacitance of the sensing capacitors.

BRIEF DESCRIPTION OF THE DRAWINGS

The above and other features and advantages of the present inventive concept will become more apparent by describing in detailed embodiments thereof with reference to the accompanying drawings.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, the present inventive concept will be explained in detail with reference to the accompanying drawings.

Figure 1:
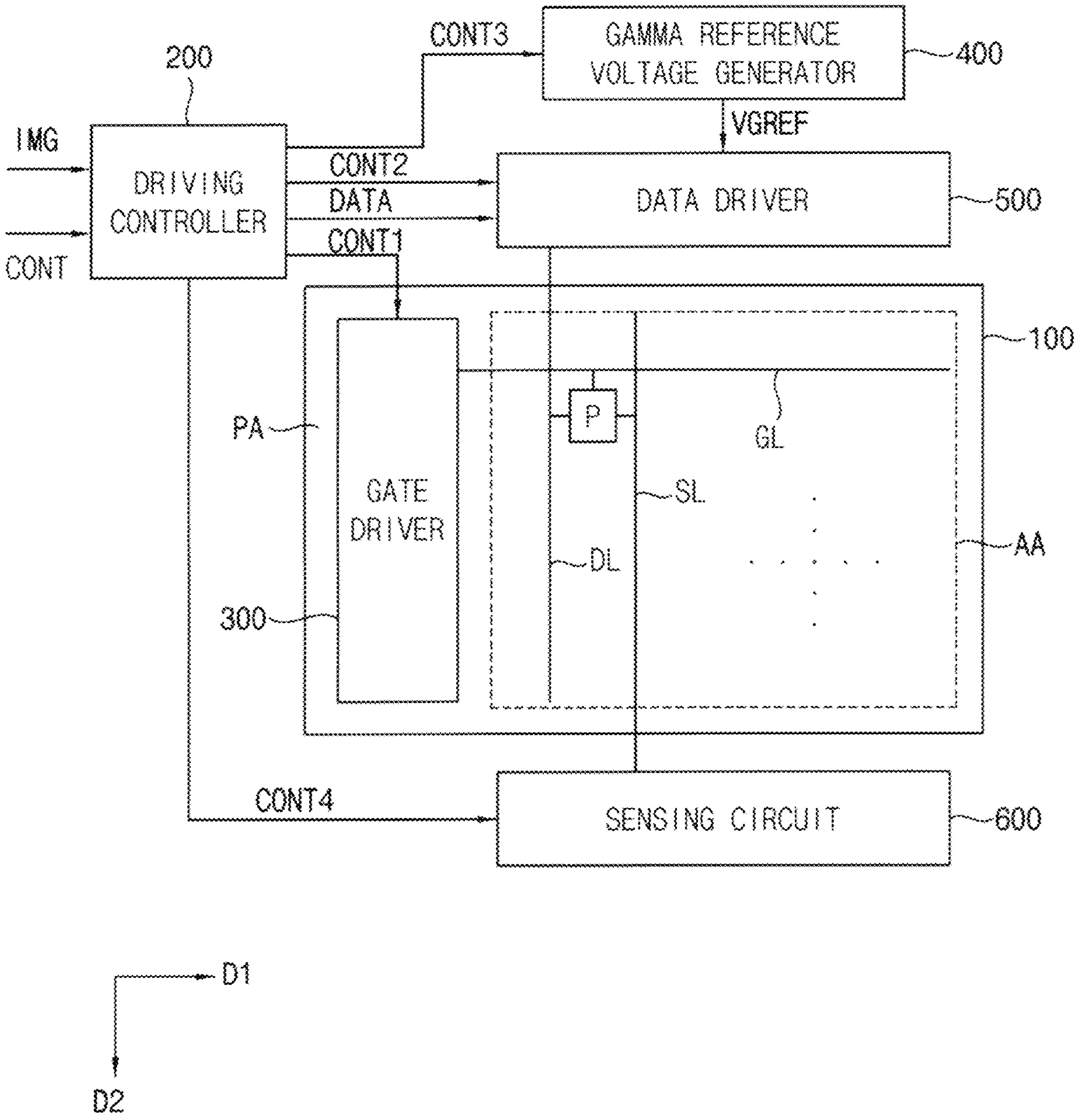
FIG. 1 is a block diagram illustrating a display device according to an embodiment of the present inventive concept.

FIG. 1 is a block diagram illustrating a display device according to an embodiment of the present inventive concept.

Referring to FIG. 1, the display device may include a display panel 100 and a display panel driver. The display panel driver may include a driving controller 200, a gate driver 300, a gamma reference voltage generator 400, a data driver 500 and a sensing circuit 600.

In an embodiment, for example, the driving controller 200 and the data driver 500 may be integrally formed. For another example, the driving controller 200, the gamma reference voltage generator 400, the data driver 500, and the sensing circuit 600 may be integrally formed. For still another example, a driving module in which the driving controller 200 and the data driver 500 are integrally formed may be referred to as a timing controller embedded data driver ("TED").

The display panel 100 may include a display region AA for displaying an image and a peripheral region PA disposed adjacent to the display region AA.

The display panel 100 may include pixels P. For example, the display panel 100 may be an organic light emitting diode display panel including an organic light emitting diode. For example, the display panel 100 may be a liquid crystal panel including a liquid crystal layer.

The display panel 100 may include a plurality of gate lines GL, a plurality of data lines DL, a plurality of sensing lines SL, and a plurality of pixels electrically connected to each of the gate lines GL, the data lines DL, and the sensing lines SL. The gate lines GL extend in a first direction D1, and the data lines DL extend in a second direction D2 crossing the first direction D1, and The sensing lines SL extend in the second direction D2.

The driving controller 200 may receive input image data IMG and an input control signal CONT from and external device. For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling the operation of the gate driver 300 based on the input control signal CONT and may output the generated first control signal CONT1 to the gate driver 300. The first control signal CONT1 may include a vertical start signal and a gate clock signal.

The driving controller 200 may generate the second control signal CONT2 for controlling the operation of the data driver 500 based on the input control signal CONT and may output the generated second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling the operation of the gamma reference voltage generator 400 based on the input control signal CONT to the gamma reference voltage generator 400.

The driving controller 200 may generate the fourth control signal CONT4 for controlling the operation of the sensing circuit 600 based on the input control signal CONT and may output the generated fourth control signal CONT4 to the sensing circuit 600. The fourth control signal CONT4 may include a vertical start signal and a gate clock signal.

The gate driver 300 may generate gate signals for driving the gate lines GL in response to the first control signal CONT1 received from the driving controller 200. The gate driver 300 may output the gate signals to the gate lines GL. For example, the gate driver 300 may be integrated on the display panel 100. For example, the gate driver 300 may be mounted on the display panel 100.

In an embodiment, for example, the gate driver 300 may be integrated on the peripheral region PA disposed adjacent to the display region AA.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to the data signal DATA.

In an embodiment, for example, the gamma reference voltage generator 400 may be disposed in the driving controller 200 or in the data driver 500.

The data driver 500 may receive the second control signal CONT2 and the data signal DATA from the driving controller 200, and the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The sensing circuit 600 may generate sensing voltages in response to the fourth control signal CONT4 received from the driving controller 200. The sensing circuit 600 may output the sensing voltages to the pixels P. The sensing circuit 600 may sense characteristic information of the pixel P. The sensing circuit 600 may operate an external compensation of the pixels P based on the characteristic information.

In an embodiment, for example, the sensing circuit 600 may be disposed in the driving controller 200 or in the data driver 500.

Figure 2:
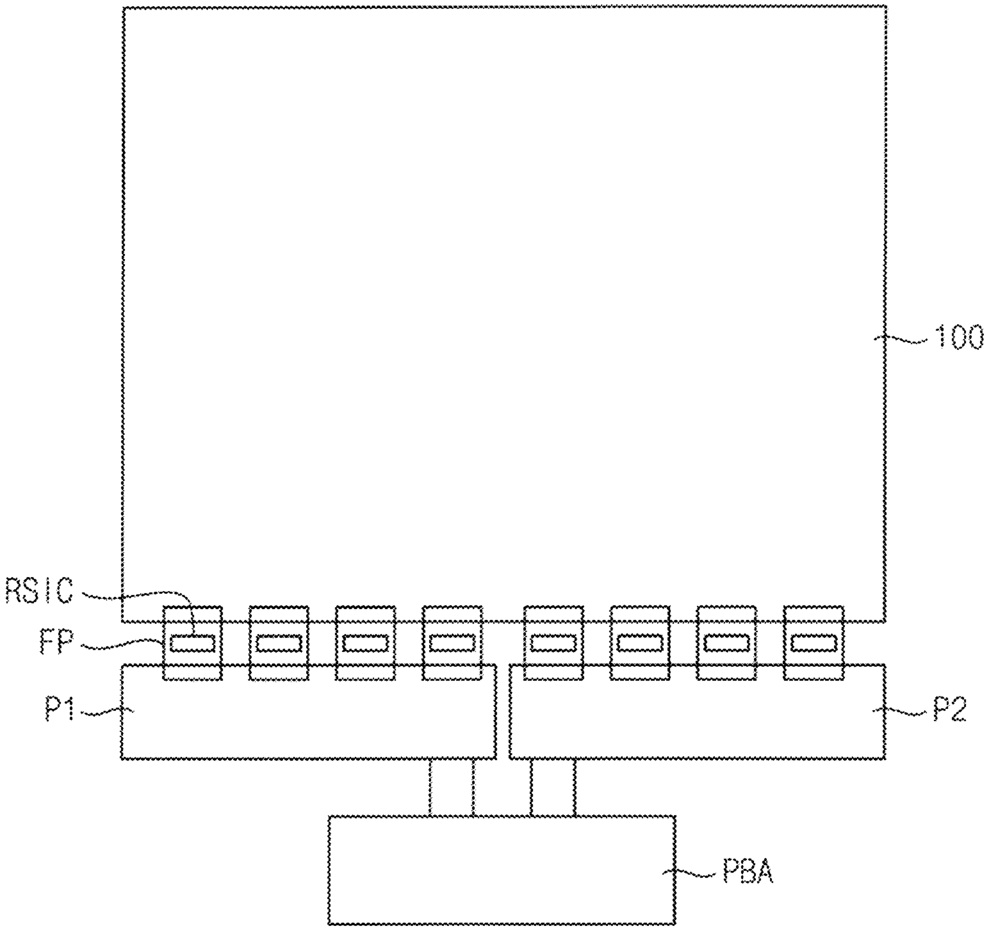
FIG. 2 is a plan view illustrating the display device of FIG. 1.

FIG. 2 is a plan view illustrating the display device of FIG. 1.

Referring to FIGS. 1 and 2, the display device may include a printed circuit board assembly PBA, a first printed circuit P1, and a second printed circuit P2. The printed circuit board assembly PBA may be connected to the first printed circuit P1 and the second printed circuit P2. For example, the driving controller 200 may be disposed in the printed circuit board assembly PBA.

The display device may include the first printed circuit P1 and a plurality of flexible circuits FP connected to the display panel 100. Also, the display device may include the second printed circuit P2 and a plurality of flexible circuits FP connected to the display panel 100.

A plurality of readout chips RSIC of the data driver 500 may be disposed in the flexible circuits FP. The readout chip RSIC may be an integrated circuit chip.

Figure 3:
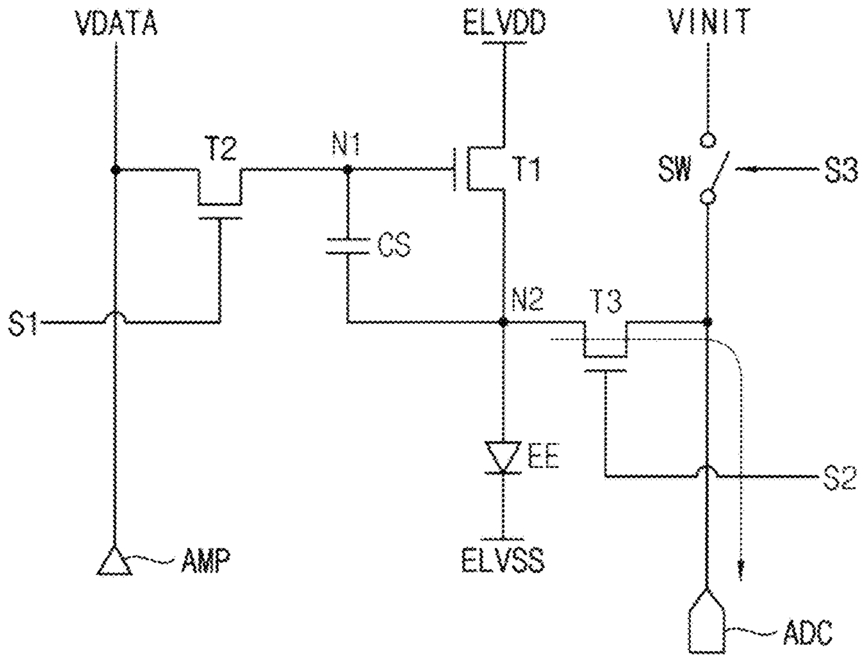
FIG. 3 is a circuit diagram illustrating a pixel included in the display device of FIG. 1.
Figure 4:
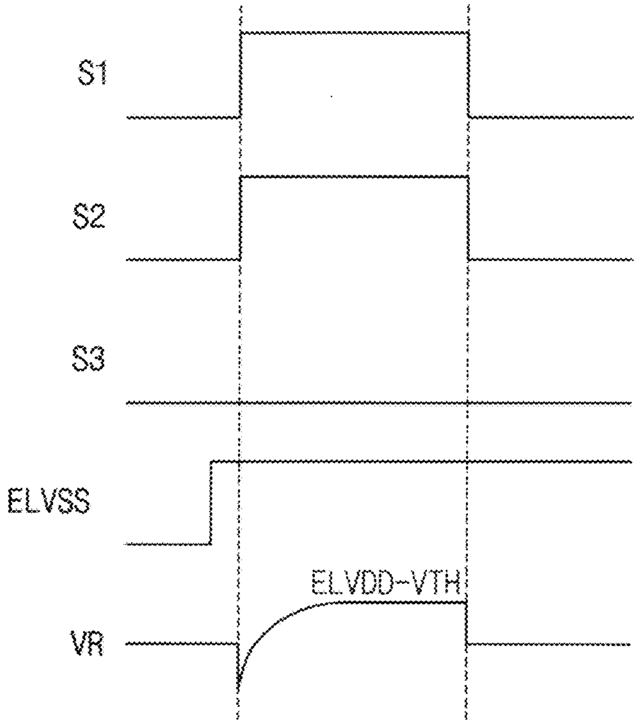
FIG. 4 is a timing diagram illustrating an input signal and an output signal of the pixel of FIG. 3 in a sensing mode.

FIG. 3 is a circuit diagram illustrating one of the pixels P included in the display device of FIG. 1, and FIG. 4 is a timing diagram illustrating an input signal and an output signal of the pixel P of FIG. 3 in a sensing mode.

Referring to FIGS. 1 to 4, The pixel P may include a first thin film transistor T1 applying a first power voltage ELVDD to a second node N2 in response to a signal from a first node N1, a second thin film transistor T2 outputting the data voltage VDATA to the first node N1 in response to a first signal S1, a third thin film transistor T3 outputting a signal of the second node N2 to a sensing node in response to a second signal S2, a storage capacitor CS including a first terminal connected to the first node N1 and a second terminal connected to the second node N2, a light emitting element EE including a first electrode connected to the second node N2 and a second electrode to which the second power voltage ELVSS is applied.

Here, the second power voltage ELVSS may be less than the first power voltage ELVDD. For example, the light emitting element EE may be an organic light emitting diode.

The pixel P may further include a switch SW for writing a sensing initialization voltage VINIT to the second node N2. The switch SW may be turned on and turned off based on the third signal S3.

In an embodiment, for example, in a sensing initialization stage, the second signal S2 and the third signal S3 are activated to apply the sensing initialization voltage VINIT to the second node N2.

The display device according to the embodiment of the present inventive concept may sense a characteristic value of the first thin film transistor T1 or sense a change in characteristic value of the first thin film transistor T1 in order to compensate for a characteristic value deviation of the first thin film transistor T1 which is a driving transistor. The display device may be configured to sense the characteristic value or the change in characteristic value of the first thin film transistor T1 in the subpixel in a sensing period of a subpixel having a 3T1C structure or a structure modified based thereon.

As shown in FIG. 4, in the sensing mode, the first signal S1 is activated, and a data voltage VDATA may be applied to the first node N1 through the second thin film transistor T2. In this case, the data voltage VDATA may be a sensing data voltage for sensing the threshold voltage of the first thin film transistor T1.

The first thin film transistor T1 may be turned on by the sensing data voltage (e.g., the data voltage VDATA) applied to the first node N1 in the sensing mode and the sensing initialization voltage VINIT applied to the second node N2 in the sensing initialization stage.

In addition, since the second signal S2 is also activated in the sensing mode, the third thin film transistor T3 may be turned on, and the signal VR of the second node N2 may be output to the sensing node through the third thin film transistor T3 and the signal VR may increase to a difference between the first power voltage ELVDD and a threshold voltage VTH of the third thin film transistor T3.

An analog-to-digital converter ADC may be disposed at the sensing node, and the analog-to-digital converter ADC may convert the signal VR of the second node N2 into a digital sensing signal and sense the characteristic information of the first thin film transistor T1. For example, the sensing circuit 600 may sense threshold voltage information, mobility information, and degradation information of the light emitting diode of the first thin film transistor T1 included in each of the pixels.

In the sensing mode, the third signal S3 may be deactivated, so that the sensing initialization voltage VINIT may not be output to the sensing node. In addition, since the second power voltage ELVSS has a high level in the sensing mode, the pixel P may not emit light.

The sensing lines SL connecting the pixels P and the sensing circuit 600 may include a sensing capacitor. The sensing capacitor may store the characteristic value of the first thin film transistor T1 or the change in characteristic value of the first thin film transistor T1 as a voltage. Here, if the characteristic value deviation between the sensing capacitors increases, the dispersion of the overall capacitance value of the sensing circuit 600 may increase, so that the sensing efficiency decreases, and a defect phenomenon in which vertical stripes are visible on the display panel 100 due to noise voltages may occur. In order to prevent such a defect phenomenon, the display device according to the present inventive concept may detect a capacitance deviation of the sensing capacitors on the sensing lines and the display device may sense characteristic information by replacing the sensing line with an additional sensing line based on the capacitance deviation.

Figure 5:
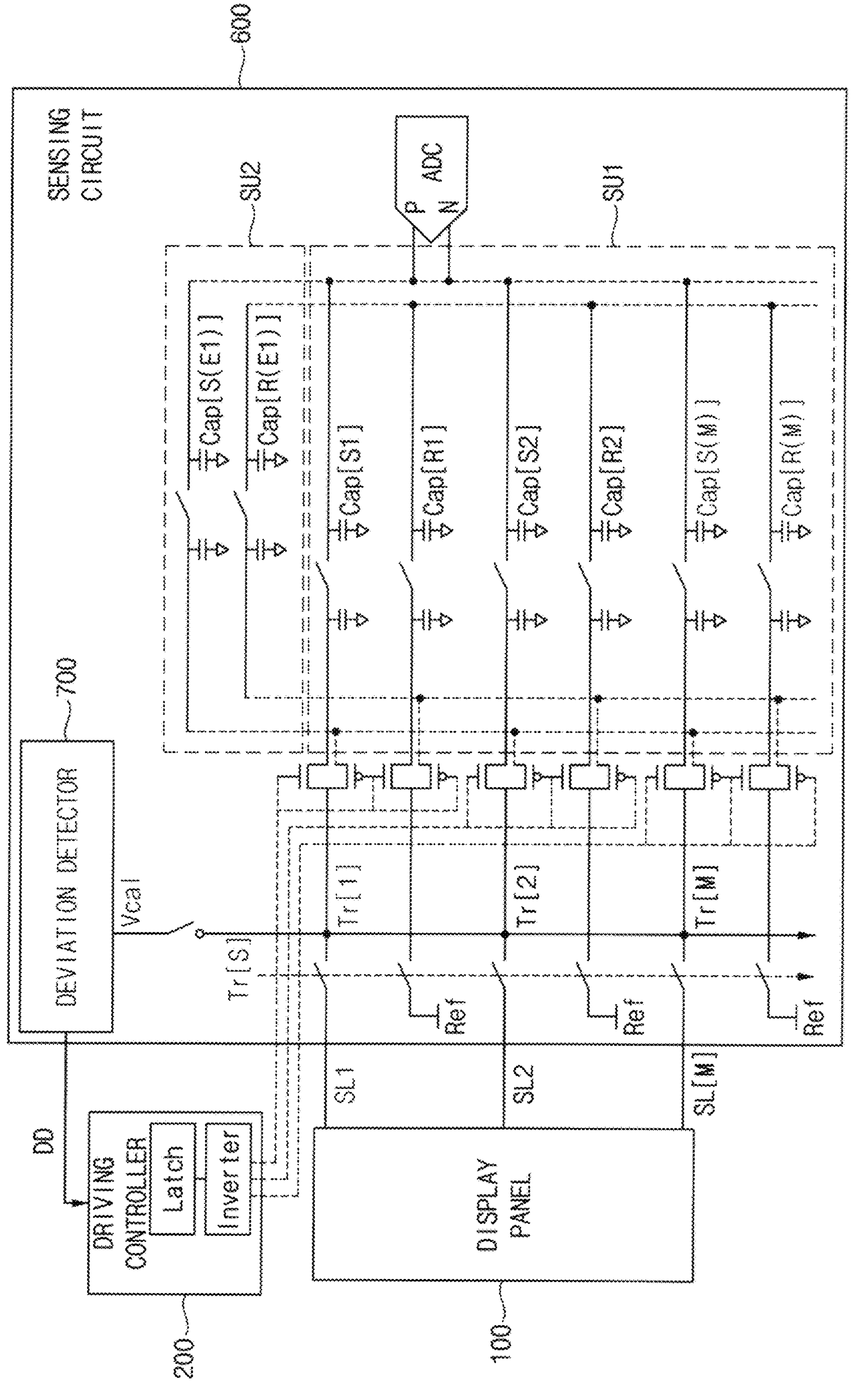
FIG. 5 is an enlarged view of a sensing circuit included in the display device of FIG. 1.

FIG. 5 is an enlarged view of a sensing circuit 600 included in the display device of FIG. 1.

Referring to FIGS. 1, 3, and 5, the display device may include a sensing circuit 600. The sensing circuit 600 may output the sensing voltage to the pixels P. The sensing circuit 600 may sense characteristic information of the pixels P. In addition, the sensing circuit 600 may operate the external compensation of the pixels P based on the characteristic information. Specifically, the analog-to-digital converter ADC may be disposed at the sensing node, and the analog-to-digital converter ADC may convert the signal VR of the second node N2 into a digital sensing signal and sense the characteristic information of the first thin film transistor T1. For example, the sensing circuit 600 may sense threshold voltage information, mobility information, and degradation information of the light emitting diode of the first thin film transistor T1 included in each of the pixels.

In an embodiment, the sensing circuit 600 may include a plurality of first sensing lines SU1 and a second sensing line SU2. The plurality of first sensing lines SU1 may be connected to the sensing lines SL1 to SL(M) extended from the display panel 100. Here, M is a positive integer. The sensing circuit 600 may detect a capacitance deviation of the sensing capacitors (e.g., Cap[S1] to Cap[S(M)]) on the plurality of first sensing lines SU1. The sensing circuit 600 may sense the characteristic information of a pixel P by replacing at least one of the first sensing line SU1 with a second sensing line SU2 based on the capacitance deviation. For example, first sensing lines SU1 included in the sensing circuit 600 may be plural, and the second sensing line SU2 may be connected to each of the first sensing lines SU1. As shown in FIG. 5, the second sensing line SU2 may be single, but the number of the second sensing line SU2 according to the present invention is not limited thereto. That is, the second line SU2 may be plural. When the second line SU2 is plural, the second sensing lines SU2 may be connected to the first sensing lines SU1, respectively. For example, each of the second sensing lines SU2 may be connected to each of the first sensing lines SU1 through a dual transistor. The dual transistor (e.g., Tr[1] to Tr[M]) connecting the first sensing line SU1 and the second sensing line SU2 may include or be composed of a N-channel metal oxide semiconductor ("NMOS") transistor.

The sensing circuit 600 may sense the characteristic information of the pixels P by replacing at least one of the first sensing lines SU1 with a second sensing line SU2 based on the capacitance deviation of the sensing capacitors on the first sensing lines SU1. When the capacitance deviation of the first sensing lines SU1 is great, the sensing circuit 600 may replace at least the first sensing line SU1 which has the greatest capacitance deviation among the first sensing lines SU1 with the second sensing line SU2. Here, the second sensing line SU2 may sense characteristic information of the pixel P by using the sensing voltage.

In an embodiment, the display device may further include a deviation detector 700. As shown in FIG. 5, the display device may detect the capacitance deviation of the sensing capacitors on the first sensing lines SU1 by using deviation detector 700. The deviation detector 700 may be disposed in the sensing circuit 600, and be integrally formed with the sensing circuit 600. In another embodiment, the deviation detector 700 may be disposed in the driving controller 200, and be integrally formed with the driving controller 200. The deviation detector 700 may detect the capacitance deviation by applying a Direct Current ("DC") voltage to the first sensing lines SU1, and obtain the deviation information DD. For example, the deviation detector 700 may detect the capacitance deviation by applying a deviation detection voltage Vcal to the first sensing lines SU1. In one embodiment, the deviation detection voltage Vcal may be a DC voltage of 2 voltages (V), but the deviation detection voltage Vcal according to the invention is not limited thereto. The deviation detector 700 may obtain the deviation information DD by applying the deviation detection voltage Vcal to the sensing circuit 600. The deviation detector 700 may transmit the deviation information DD to the driving controller 200. The driving controller 200 may receive the deviation information DD. The driving controller 200 may control a level of a logic voltage applied to a gate electrode of the dual transistor included in the sensing circuit 600 based on the capacitance deviation. Accordingly, the driving controller 200 may sense the characteristic information of the pixels P by replacing the first sensing lines SU1 with the second sensing line SU2 based on the capacitance deviation of the sensing capacitors.

The display device according to the present inventive concept may reduce the capacitance deviation of sensing capacitors of the sensing lines, so that the display device improve a image quality of a display panel. In addition, the display device according to the present inventive concept may improve the yield of the display device by reducing the defective rate of the sensing circuit 600 due to an increase in the dispersion of the sensing capacitors of the display device. In addition, the display device according to the present inventive concept may reduce a manufacturing cost of the display device by reducing a capacitance of the sensing capacitors.

Figure 6:
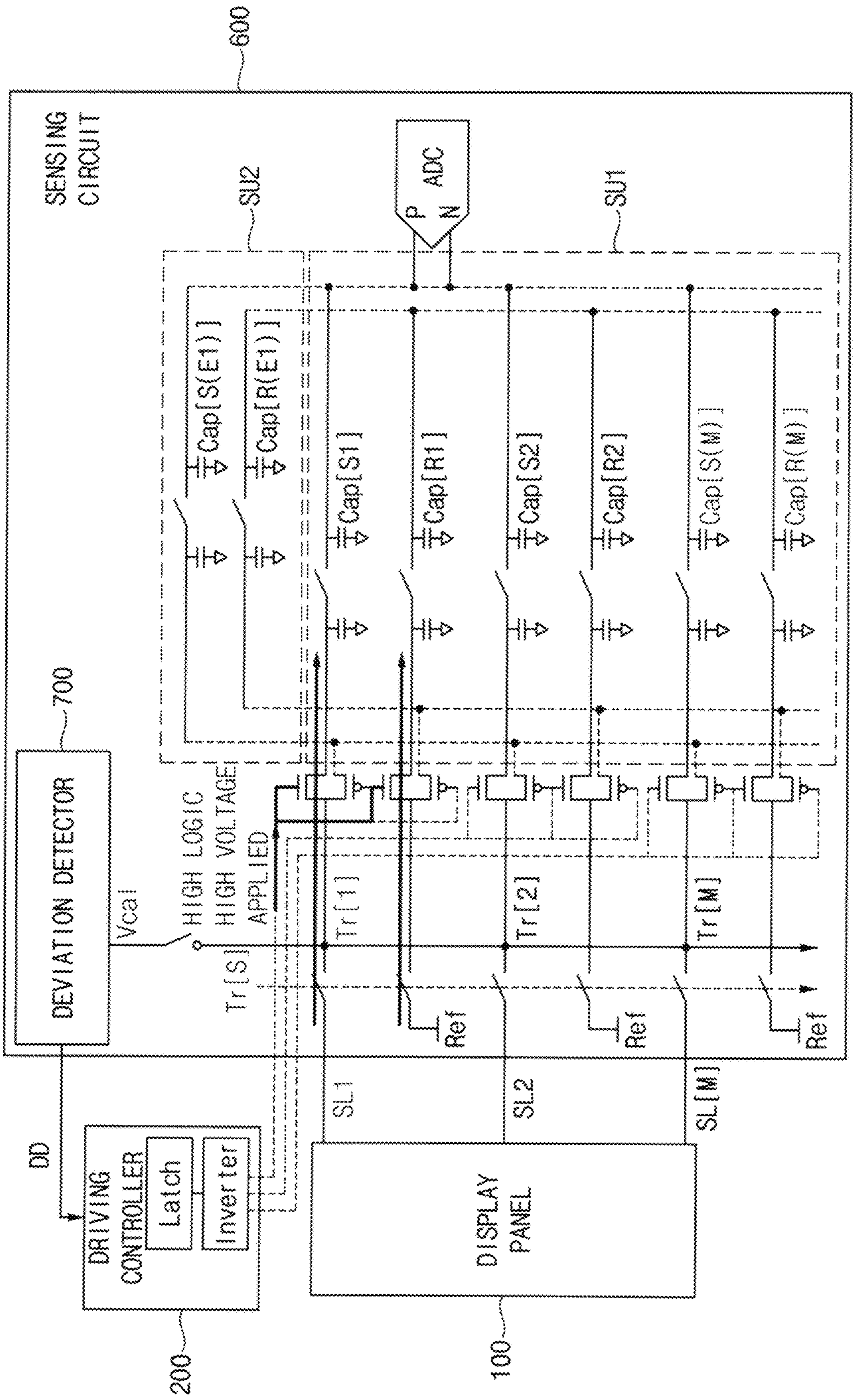
FIG. 6 is a diagram illustrating an example of sensing characteristic information of the pixel through first sensing lines.
Figure 7:
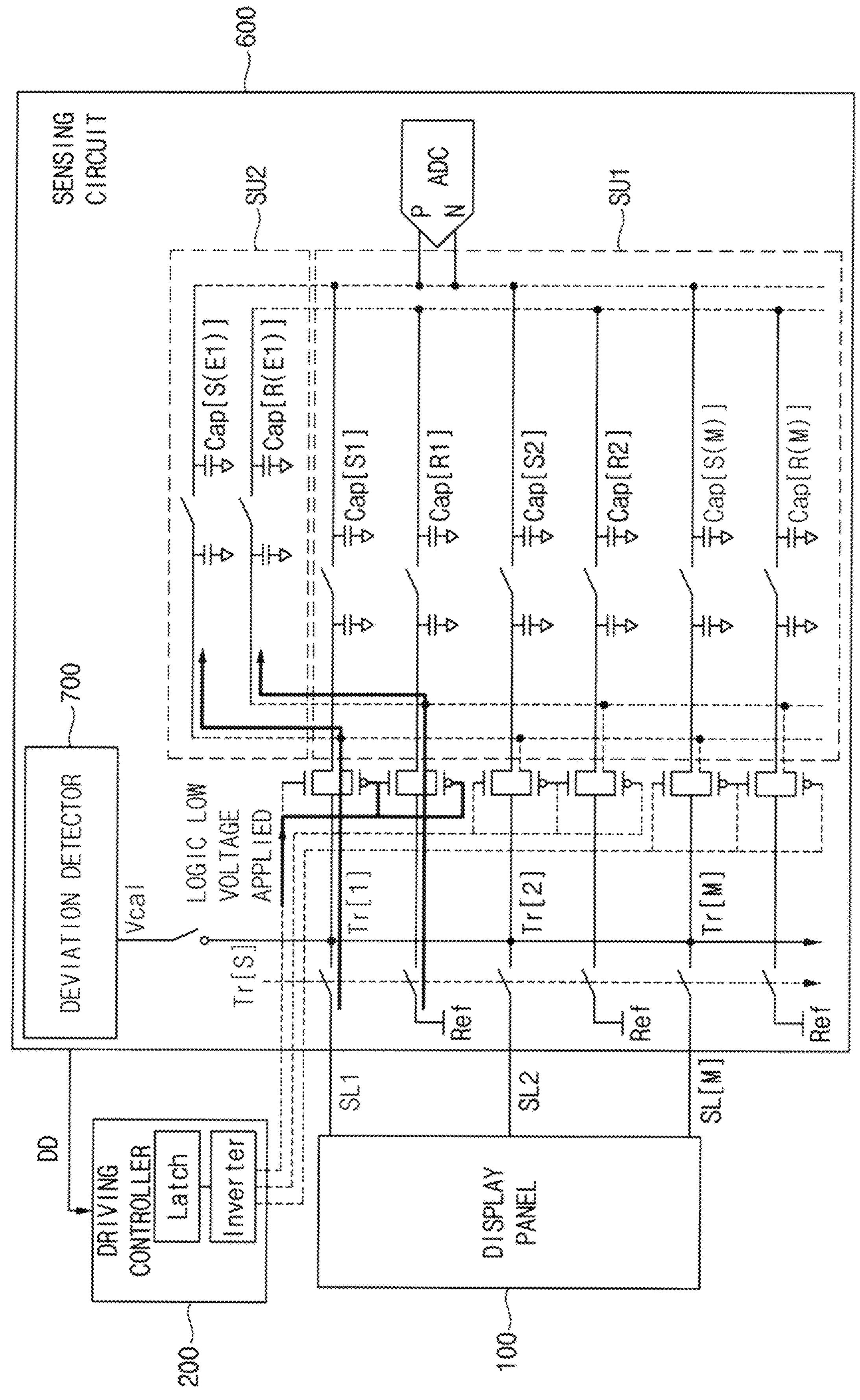
FIG. 7 is a diagram illustrating an example of sensing characteristic information of the pixel through a second sensing line.

FIG. 6 is a diagram illustrating an example of sensing characteristic information of the pixel through first sensing lines SU1, and FIG. 7 is a diagram illustrating an example of sensing characteristic information of the pixel through a second sensing line SU2.

Referring to FIGS. 1, and 5 to 7, the driving controller 200 may receive deviation information DD of capacitance values of the sensing capacitor from the deviation detector 700. The driving controller 200 may receive the deviation information DD and control the level of the logic voltage applied to the gate electrode of the dual transistor included in the sensing circuit 600 based on the capacitance deviation. The driving controller 200 may control the level of the logic voltage applied to the gate electrode of the dual transistor to a logic high voltage or a logic low voltage. Specifically, the driving controller 200 may determine whether the capacitance deviation of the first sensing lines SU1 is abnormal based on the deviation information DD. When the capacitance deviation of the first sensing lines SU1 is normal, the driving controller 200 may apply the logic high voltage to the gate electrode of the dual transistor. The sensing circuit 600 may sense characteristic information of the pixels P through the first sensing lines SU1 when the logic high voltage is applied from the driving controller 200. When the capacitance deviation of the first sensing line SU1 is abnormal, the driving controller 200 may determine the first sensing lines SU1 as defective. When one of the first sensing lines SU1 is defective, the driving controller 200 may apply the logic low voltage to the gate electrode of the dual transistor. The sensing circuit 600 may sense characteristic information of the pixels P through the second sensing line SU2 when the logic low voltage is applied from the driving controller 200.

In an embodiment, the sensing circuit 600 may sense characteristic information of the pixels P through the first sensing lines SU1. As shown in FIG. 6, the driving controller 200 may receive the deviation information DD from the deviation detector 700, and control the level of the logic voltage applied to the gate electrode of the dual transistor included in the sensing circuit 600 based on the capacitance deviation. Specifically, the deviation detector 700 may obtain the deviation information DD by applying the deviation detection voltage Vcal to the first sensing lines SU1, and transmit the deviation information DD to the driving controller 200. The driving controller 200 may receive the deviation information DD from the deviation detector 700, and apply the logic high voltage to the gate electrode of the dual transistor when the deviation of the first sensing line SU1 is normal. When the logic high voltage is applied to the gate electrode of the dual transistor, the dual transistor may switch, so that the sensing voltage is applied to the first sensing line SU1. In this case, the sensing circuit 600 may output the sensing voltage to the first sensing line SU1 to sense threshold voltage information, mobility information, and degradation information of the light emitting diode of the first thin film transistor T1 included in each of the pixels P.

In an embodiment, the sensing circuit 600 may sense characteristic information of the pixels P through the second sensing line SU2. As shown in FIG. 7, the driving controller 200 may receive the deviation information DD from the deviation detector 700, and control the level of the logic voltage applied to the gate electrode of the dual transistor included in the sensing circuit 600 based on the capacitance deviation. Specifically, the deviation detector 700 may obtain the deviation information DD by applying the deviation detection voltage Vcal to the first sensing lines SU1, and transmit the deviation information DD to the driving controller 200. The driving controller 200 may receive the deviation information DD from the deviation detector 700, and when the capacitance deviation of the first sensing line SU1 is abnormal, the driving controller 200 may apply the logic low voltage to the gate electrode of the dual transistor. When the logic low voltage is applied to the gate electrode of the dual transistor, the dual transistor may switch, so that the sensing voltage is applied to the second sensing line SU2. In this case, the sensing circuit 600 may output the sensing voltage to the second sensing line SU2 to sense threshold voltage information, mobility information, and degradation information of the light emitting diode of the first thin film transistor T1 included in each of the pixels P. In FIG. 7, the second sensing line SU2 is illustrated as a single line, but the number of the second sensing line SU2 according to the present invention is not limited thereto. That is, the second line SU2 may be provided in plural. When the second line SU2 is provided in plural, he second sensing lines SU2 may be connected to the first sensing lines SU1, respectively. For example, each of the second sensing lines SU2 may be connected to each of the first sensing lines SU1 through a dual transistor. When the capacitance deviation of the first sensing lines SU1 is great, the sensing circuit 600 may replace at least the first sensing line SU1 which has the greatest capacitance deviation among the first sensing lines SU1 with the second sensing line SU2.

The display device according to the present inventive concept may reduce the capacitance deviation of sensing capacitors of the sensing lines, so that the display device improve a image quality of a display panel. In addition, the display device according to the present inventive concept may improve the yield of the display device by reducing the defective rate of the sensing circuit 600 due to an increase in the dispersion of the sensing capacitors of the display device. In addition, the display device according to the present inventive concept may reduce a manufacturing cost of the display device by reducing a capacitance of the sensing capacitors.

Figure 8:
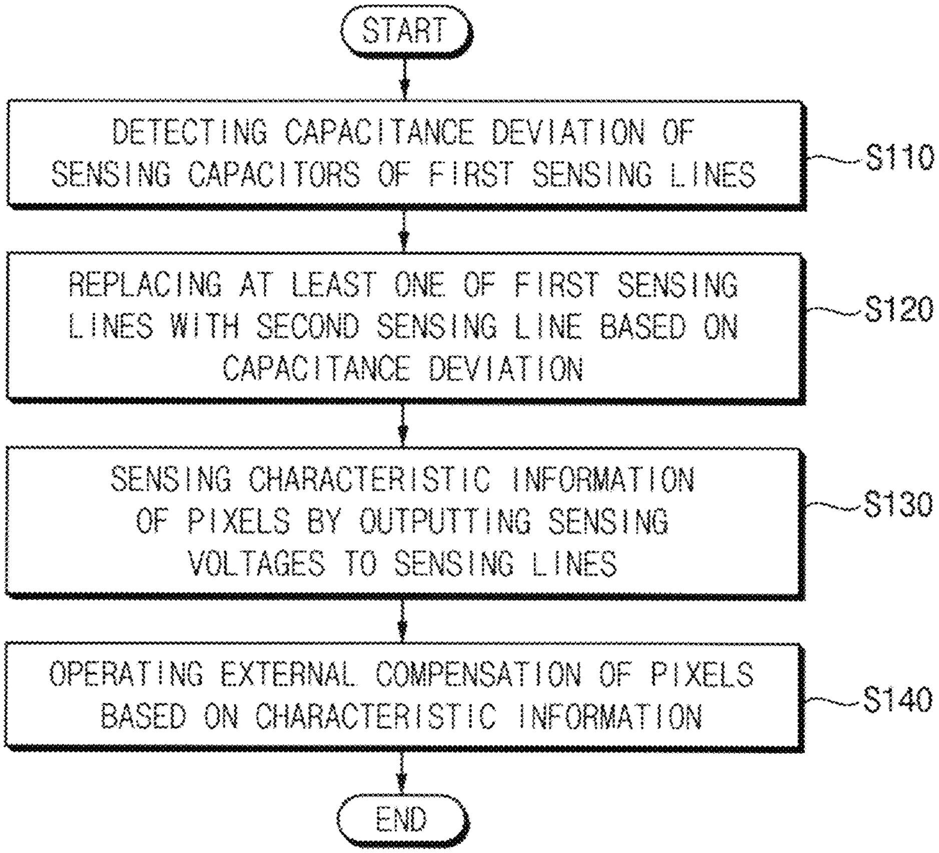
FIG. 8 is a flowchart illustrating operations of the display device of FIG. 1 according to an embodiment of the present inventive concept.

FIG. 8 is a flowchart illustrating operations of the display device of FIG. 1 according to an embodiment of the present inventive concept.

Referring to FIGS. 1, and 5 to 8, the display device according to embodiments of the present inventive concept may detect the capacitance deviation of the sensing capacitors of the first sensing lines SU1 (operation S110), replace at least one of the first sensing lines SU1 with the second sensing line SU2 based of the capacitance deviation (operation S120), sense the characteristic information of the pixels P by outputting the sensing voltages to sensing lines (operation S130), and operate the external compensation of the pixels P based on the characteristic information (operation S140).

In an embodiment, the display device may detect the capacitance deviation of the sensing capacitors of the first sensing lines SU1 (operation S110). Specifically, the display device may include the deviation detector 700. The display device may detect the capacitance deviation of the sensing capacitors on the first sensing lines SU1 by using the deviation detector 700. When the capacitance deviation between the sensing capacitors increases, the dispersion of the overall capacitance value of the sensing circuit 600 may increase, so that the sensing efficiency decreases, and vertical stripes are visually recognized on the display panel due to noise voltages. In order to prevent such a defect phenomenon, the deviation detector 700 according to an embodiment of the invention may obtain the deviation information DD by applying the deviation detection voltage Vcal to the sensing circuit 600. The deviation detector 700 may transmit the deviation information DD to the driving controller 200.

In an embodiment, the display device may replace at least one of the first sensing lines SU1 with the second sensing line SU2 based of the capacitance deviation (operation S120) after obtain the deviation information DD. Specifically, the driving controller 200 may receive the deviation information DD, and control the level of the logic voltage applied to the gate electrode of the dual transistor included in the sensing circuit 600 based on the capacitance deviation. The sensing circuit 600 may replace the first sensing lines SU1 with the second sensing line SU2 according to the level of the logic voltage applied to the gate electrode of the dual transistor by the driving controller 200. For example, when the capacitance deviation of the first sensing lines SU1 is great, the sensing circuit 600 may replace at least the first sensing line SU1 which has the greatest capacitance deviation among the first sensing lines SU1 with the second sensing line SU2.

In an embodiment, the display device may sense the characteristic information of the pixels P by outputting the sensing voltages to sensing lines (operation S130), and operate the external compensation of the pixels P based on the characteristic information (operation S140). Specifically, the analog-to-digital converter ("ADC") may disposed at the sensing node of the sensing circuit 600. The analog-to-digital converter (ADC) may convert the signal of the second node N2 of the pixels P into a digital sensing signal, and sense the characteristic information of the first thin film transistor T1. For example, the sensing circuit 600 may sense threshold voltage information, mobility information, and degradation information of the light emitting diode of the first thin film transistor T1 included in each of the pixels P. In this case, the driving controller 200 may operate the external compensation on the pixel based on the threshold voltage, mobility, and degradation of the light emitting diode of the first thin film transistor T1. For example, the driving controller 200 may control the data driver 500, so that the data driver 500 may generate an optimized data voltage corresponding to the threshold voltage, the mobility, and the degradation of the light emitting diode of the first thin film transistor T1.

Figure 9:
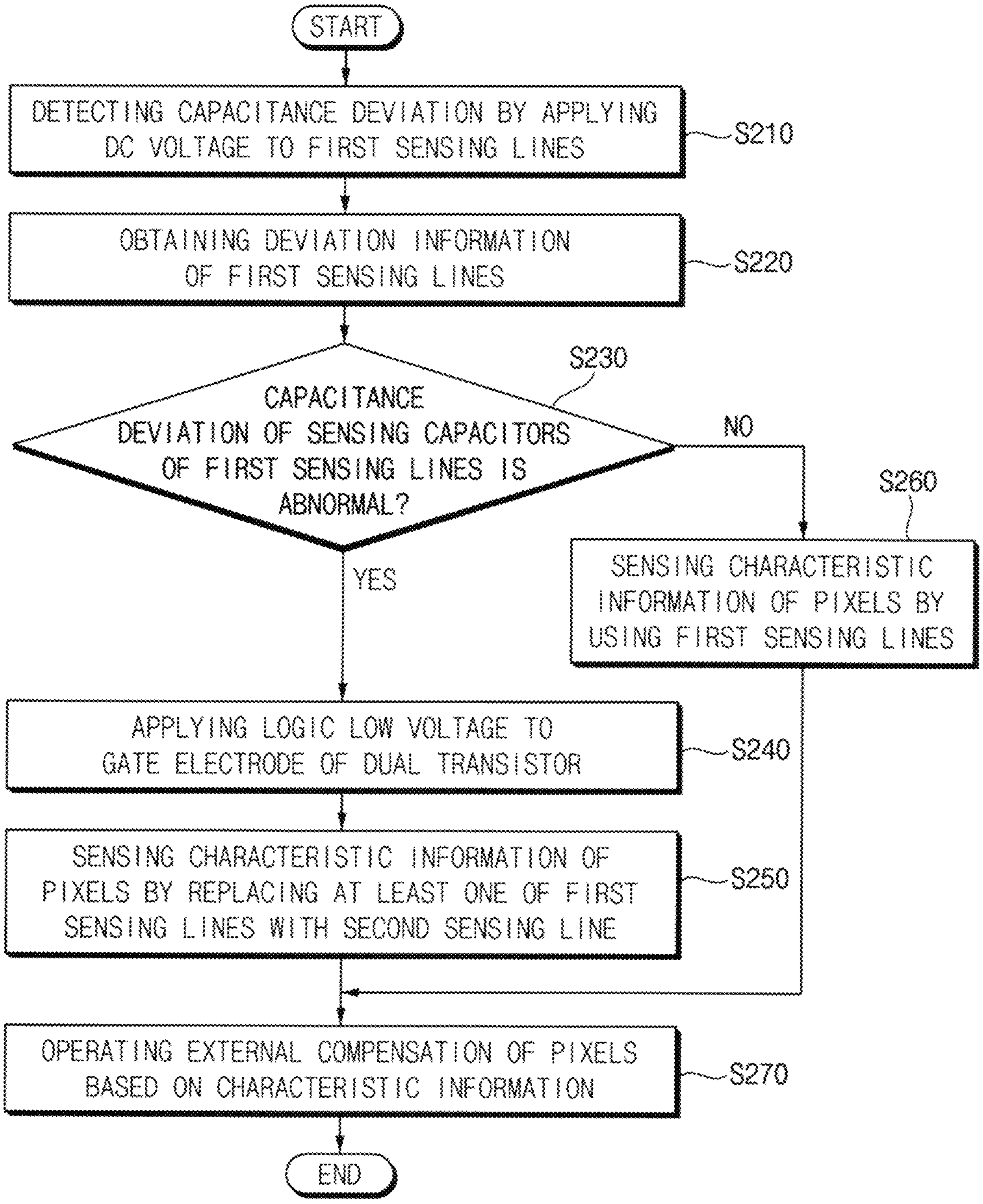
FIG. 9 is a flowchart illustrating operations of the sensing circuit included in the display device of FIG. 1.

FIG. 9 is a flowchart illustrating operations of the sensing circuit included in the display device of FIG. 1.

Referring to FIG. 9, the display device according to embodiments of the present inventive concept may detect the capacitance deviation by applying DC voltage to the first sensing lines SU1 (operation S210), obtain the deviation information of the first sensing lines SU1 (operation S220), and determine whether the capacitance deviation of the first sensing lines SU1 is abnormal (operation S230). When the capacitance deviation of the first sensing line SU1 is abnormal, the display device may apply the logic low voltage to the gate electrode of the dual transistor (operation S240), sense the characteristic information of the pixels P by replacing at least one of the first sensing lines SU1 with the second sensing line SU2 (operation S250), and operate the external compensation of the pixels P based on the characteristic information (operation S270). When the capacitance deviation of the first sensing line SU1 is normal, the display device may sense the characteristic information of the pixels P by using the first sensing lines SU1 (operation S260), and operate the external compensation of the pixels P based on the characteristic information (operation S270).

In an embodiment, the display device may detect the capacitance deviation by applying DC voltage to the first sensing lines SU1 (operation S210), obtain the deviation information of the first sensing lines SU1 (operation S220), and determine whether the capacitance deviation of the first sensing lines SU1 is abnormal (operation S230). Specifically, the display device may detect the capacitance deviation of the sensing capacitors on the first sensing lines SU1 by using the deviation detector 700. The deviation detector 700 may detect the capacitance deviation by applying a DC voltage to the first sensing lines SU1, and obtain the deviation information DD. For example, the deviation detector 700 may detect the capacitance deviation by applying a deviation detection voltage Vcal to the first sensing lines SU1. In one embodiment, the deviation detection voltage Vcal may be a DC voltage of 2V, but the deviation detection voltage Vcal according to the invention is not limited thereto. The deviation detector 700 may obtain the deviation information DD by applying the deviation detection voltage Vcal to the sensing circuit 600. The deviation detector 700 may transmit the deviation information DD to the driving controller 200. The driving controller 200 may determine whether the capacitance deviation of the first sensing lines SU1 is abnormal. For example, when the capacitance deviation of the specific first sensing line SU1 is greater than or equal to a reference deviation, the driving controller 200 may determine the corresponding first sensing line SU1 as abnormal. In this case, the reference deviation may be a value previously input and set by the user.

The sensing circuit 600 may include a plurality of first sensing lines SU1 and a second sensing line SU2. The sensing circuit 600 may detect a capacitance deviation of the sensing capacitors on the plurality of first sensing lines SU1. The sensing circuit 600 may sense the characteristic information of a pixel P by replacing at least one of the first sensing line SU1 with a second sensing line SU2 based on the capacitance deviation. For example, first sensing lines SU1 included in the sensing circuit 600 may be plural, and the second sensing line SU2 may be connected to each of the first sensing lines SU1. As shown in FIG. the second sensing line SU2 may be single, but the number of the second sensing line SU2 according to the present invention is not limited thereto. That is, the second line SU2 may be provided in plural. When the second line SU2 is plural, the second sensing lines SU2 may be connected to the first sensing lines SU1, respectively. For example, each of the second sensing lines SU2 may be connected to each of the first sensing lines SU1 through the dual transistor. The dual transistor connecting the first sensing line SU1 and the second sensing line SU2 may be composed of the N-channel metal oxide semiconductor ("NMOS") transistor.

In an embodiment, when the capacitance deviation of the first sensing line SU1 is abnormal, the display device may apply the logic low voltage to the gate electrode of the dual transistor (operation S240), sense the characteristic information of the pixels P by replacing at least one of the first sensing lines SU1 with the second sensing line SU2 (operation S250). Specifically, the driving controller 200 may receive the deviation information DD from the deviation detector 700, and when the capacitance deviation of the first sensing line SU1 is abnormal, the driving controller 200 may apply the logic low voltage to the gate electrode of the dual transistor. When the logic low voltage is applied to the gate electrode of the dual transistor, the dual transistor may switch, so that the sensing voltage is applied to the second sensing line SU2. In this case, the sensing circuit 600 may output the sensing voltage to the second sensing line SU2 to sense threshold voltage information, mobility information, and degradation information of the light emitting diode of the first thin film transistor T1 included in each of the pixels P. The second sensing line SU2 may be single, or the second sensing line SU2 may be plural. When the second line SU2 is plural, each of the second sensing lines SU2 may be connected to each of the first sensing lines SU1. For example, each of the second sensing lines SU2 may be connected to each of the first sensing lines SU1 through a dual transistor. When the capacitance deviation of the first sensing lines SU1 is great, the sensing circuit 600 may sequentially replace at least the first sensing line SU1 which has the greatest capacitance deviation among the first sensing lines SU1 with the second sensing line SU2.

In an embodiment, when the capacitance deviation of the first sensing line SU1 is normal, the display device may sense the characteristic information of the pixels P by using the first sensing lines SU1 (operation S260). Specifically, the driving controller 200 may receive the deviation information DD from the deviation detector 700, and apply the logic high voltage to the gate electrode of the dual transistor when the deviation of the first sensing line SU1 is normal. When the logic high voltage is applied to the gate electrode of the dual transistor, the dual transistor may switch, so that the sensing voltage is applied to the first sensing line SU1. In this case, the sensing circuit 600 may output the sensing voltage to the first sensing line SU1 to sense threshold voltage information, mobility information, and degradation information of the light emitting diode of the first thin film transistor T1 included in each of the pixels P.

In an embodiment, the display device may operate the external compensation of the pixels P based on the characteristic information (operation S270). For example, the driving controller 200 may operate the external compensation on the pixels P based on the threshold voltage information, the mobility information, and the degradation information of the light emitting diode of the first thin film transistor T1. For example, the driving controller 200 may control the data driver 500, so that the data driver 500 generates an optimized data voltage corresponding to the threshold voltage information, the mobility information, and the degradation information of the light emitting diode of the first thin film transistor T1. The display may check whether or not the capacitance deviation is improved. For example, when the deviation detector 700 detects the characteristic information of the pixels P by replacing the first sensing lines SU1 with the second sensing line SU2, the DC voltage is applied to the first sensing lines SU1. The deviation detector 700 may check whether the capacitance deviation is effectively improved from the DC voltage applied to the first sensing lines SU1.

The display device according to the present inventive concept may reduce the capacitance deviation of sensing capacitors of the sensing lines, so that the display device improve a image quality of a display panel. In addition, the display device according to the present inventive concept may improve the yield of the display device by reducing the defective rate of the sensing circuit 600 due to an increase in the dispersion of the sensing capacitors of the display device. In addition, the display device according to the present inventive concept may reduce a manufacturing cost of the display device by reducing a capacitance of the sensing capacitors. As a result, the display device according to the present inventive concept may improve the reliability of a display quality.

The present inventive concept may be applied to any display device and an electronic device including the same. For example, the present inventive concept may be applied to a digital TV, a 3D TV, a mobile phone, a smart phone, a tablet computer, a virtual reality device, a PC, a home electronic device, a notebook computer, a PDA, a PMP, a digital camera, a music player, a portable game console, a navigation, etc.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as operating the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display device comprising:

a display panel including a plurality of pixels;

a display panel driving circuit configured to drive the display panel; and a sensing circuit configured to senses characteristic information of the pixels and electrically connected to the pixels through sensing lines, wherein the sensing circuit includes first sensing lines connected to the sensing lines and a second sensing line, and wherein at least one of the first sensing lines is replaced with the second sensing line to bypass the at least one of the first sensing lines when a capacitance deviation of sensing capacitors of the first sensing lines is detected.

2. The display device of claim 1, wherein the at least one of the first sensing lines and the second sensing line are connected by a dual transistor.

3. The display device of claim 2, wherein the dual transistor is composed of a N-channel metal oxide semiconductor transistor.

4. The display device of claim 2, wherein the display panel driving circuit controls a level of a logic voltage applied to a gate electrode of the dual transistor based on whether the capacitance deviation is detected.

5. The display device of claim 4, wherein, when the sensing circuit receives a logic high voltage from the display panel driving circuit, the sensing circuit senses the characteristic information of the pixels using the first sensing lines.

6. The display device of claim 4, wherein, when the sensing circuit receives a logic low voltage from the display panel driving circuit, the sensing circuit senses the characteristic information of the pixels using the second sensing line.

7. The display device of claim 1, wherein the sensing circuit includes a deviation detector which detects the capacitance deviation by applying a DC voltage to the first sensing lines.

8. The display device of claim 7, wherein, when the sensing circuit senses the characteristic information using the second sensing line which is replaced the at least one of the first sensing lines, the deviation detector applies the DC voltage to the first sensing lines to check whether the capacitance deviation is improved.

9. The display device of claim 1, wherein the second sensing line is connected to each of the first sensing lines.

10. The display device of claim 9, wherein a first sensing line which has a greatest capacitance deviation among the first sensing lines is replaced with the second sensing line.

11. The display device of claim 9, wherein the second sensing line is provided in plural.

12. A method of sensing characteristic information of pixels included in a display device, the method comprising:

detecting a capacitance deviation of sensing capacitors of first sensing lines connected to sensing lines which are directly connected to the pixels;

replacing at least one of the first sensing lines with a second sensing line to bypass the at least one of the first sensing lines in response to the capacitance deviation; and sensing the characteristic information of the pixels using the second sensing line which is replaced the at least one of the first sensing lines.

13. The method of claim 12, wherein the at least one of the first sensing lines and the second sensing line are connected by a dual transistor.

14. The method of claim 13, wherein the dual transistor is composed of a N-channel metal oxide semiconductor transistor.

15. The method of claim 13, wherein a level of a logic voltage applied to a gate electrode of the dual transistor is controlled based on whether the capacitance deviation is detected.

16. The method of claim 12, wherein the capacitance deviation is detected by applying a DC voltage to the first sensing lines.

17. The method of claim 16, wherein, when the characteristic information of the pixels are sensed by replacing the at least one of the first sensing lines with the second sensing line, the DC voltage is applied to the first sensing lines to check whether the capacitance deviation is improved.

18. The method of claim 12, wherein the second sensing line is connected to each of the first sensing lines.

19. The method of claim 18, wherein a first sensing line which has a greatest capacitance deviation among the first sensing lines is replaced with the second sensing line.

20. The method of claim 18, wherein the second sensing line is provided in plural.

* * * * *